United States Patent
Haro et al.

(10) Patent No.: US 9,510,204 B2
(45) Date of Patent: *Nov. 29, 2016

(54) APPARATUS AND METHOD OF DETERMINING FRAUDULENT USE OF A MOBILE DEVICE BASED ON BEHAVIORAL ABNORMALITY

(71) Applicant: Life360, Inc., San Francisco, CA (US)

(72) Inventors: Alexander Haro, San Francisco, CA (US); Christopher Hulls, Point Reyes, CA (US); Michael Borsuk, San Francisco, CA (US); Michael Hood, San Francisco, CA (US)

(73) Assignee: LIFE360, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/194,060

(22) Filed: Feb. 28, 2014

(65) Prior Publication Data

US 2015/0249925 A1 Sep. 3, 2015

(51) Int. Cl.
*H04W 12/12* (2009.01)
*H04W 4/02* (2009.01)

(52) U.S. Cl.
CPC ............. *H04W 12/12* (2013.01); *H04W 4/028* (2013.01)

(58) Field of Classification Search
CPC ..... H04W 4/02; H04W 12/12; H04W 64/00; H04W 4/028; H04W 40/20; H04W 4/22; H04W 4/023; H04W 4/021; H04W 4/025; G06F 2221/2111; G01S 5/0027; G01S 19/42; G01S 5/04; G01S 5/12
USPC .................. 340/539.13; 455/456.1; 701/119; 640/539.11
See application file for complete search history.

(56) References Cited

U.S. PATENT DOCUMENTS 7,376,431 B2 5/2008 Niedermeyer
7,684,809 B2 3/2010 Niedermeyer
(Continued)

FOREIGN PATENT DOCUMENTS

WO 2012000107 A1 1/2012

OTHER PUBLICATIONS

Tittle: Human Behaviour Analysis Using Data Collected from Mobile Devices; Authors: Muhammad Awais Azam, Jonathan Loo, Sardar Kashif Ashraf Khan, Muhammad Adeel, Waleed Ejaz; International Journal on Advances in Life Sciences, vol. 4 No. 1 & 2, year 2012.*

(Continued)

*Primary Examiner* — Marisol Figueroa
(74) *Attorney, Agent, or Firm* — Blakely Sokoloff Taylor & Zafman LLP

(57) ABSTRACT

Method of determining fraudulent use based on behavioral abnormality starts with processor receiving first location data and first proximity information from first mobile device. First proximity information includes identification of mobile devices within proximity sensitivity radius of first mobile device. Processor determines whether first location data and first proximity information are included in historical location data and historical proximity information, respectively, associated with first mobile device. When first location data and first proximity information is not included, processor determines whether subsequent location data and subsequent proximity information received from first mobile device over predetermined period of time is included. Processor signals to monitor fraudulent use of first mobile device when subsequent location data and subsequent proximity information received from first mobile device over predetermined period of time is not included in historical location data and historical proximity information, respectively, associated with first mobile device. Other embodiments are described.

20 Claims, 6 Drawing Sheets

(56) References Cited

U.S. PATENT DOCUMENTS

| | | | |
|---|---|---|---|
| 8,180,873 B2 | 5/2012 | Bhatt et al. | |
| 8,295,812 B1 | 10/2012 | Jones | |
| 8,340,259 B2 | 12/2012 | Mahone et al. | |
| 8,447,674 B2 | 5/2013 | Choudhuri et al. | |
| 8,483,663 B1 | 7/2013 | Jones | |
| 8,515,390 B2 | 8/2013 | Grealish et al. | |
| 8,532,619 B2 | 9/2013 | Krafzik et al. | |
| 8,539,070 B2 | 9/2013 | Barber | |
| 8,666,373 B2 | 3/2014 | Dessouky et al. | |
| 2003/0045270 A1* | 3/2003 | Agrawal | H04M 3/2218 455/410 |
| 2008/0088437 A1* | 4/2008 | Aninye et al. | 340/539.13 |
| 2009/0254975 A1* | 10/2009 | Turnbull | H04L 63/0492 726/3 |
| 2011/0016363 A1 | 1/2011 | Washio | |
| 2011/0171973 A1 | 7/2011 | Beck et al. | |
| 2011/0238755 A1 | 9/2011 | Khan et al. | |
| 2012/0278387 A1* | 11/2012 | Garcia et al. | 709/204 |
| 2013/0024300 A1* | 1/2013 | Choudhuri | G06Q 40/02 705/16 |
| 2013/0046692 A1 | 2/2013 | Grigg et al. | |
| 2013/0085861 A1* | 4/2013 | Dunlap | 705/14.58 |
| 2013/0232201 A1* | 9/2013 | Jennings | H04W 4/02 709/204 |
| 2013/0260795 A1* | 10/2013 | Papakipos et al. | 455/456.3 |
| 2013/0263212 A1 | 10/2013 | Faltyn et al. | |
| 2014/0221012 A1* | 8/2014 | Uetabira | H04W 4/028 455/456.3 |
| 2015/0262435 A1* | 9/2015 | Delong | G07C 5/0816 340/439 |

OTHER PUBLICATIONS

Notification of Trans. of the International Search Report and the Written Opinion of the Int. Search Authority, dated May 22, 2015 for International Application No. PCT/US2015/017337 (Feb. 24, 2015).

PCT/US2015/017337, "Notification of Transmittal of the International Search Report and the Written Opinion of the International Searching Authority, or the Declaration", mailed May 22, 2015.

* cited by examiner

APPARATUS AND METHOD OF DETERMINING FRAUDULENT USE OF A MOBILE DEVICE BASED ON BEHAVIORAL ABNORMALITY

FIELD

The invention relates to system and method for use in identifying possibility for fraud using mobile devices and specifically, determining abnormal behavior of mobile devices using group associations, proximity identification, and location identification of the mobile device, to identify possibility of fraud using the mobile device.

BACKGROUND

The prolific growth of cell phones and other mobile devices like iPads and other mobile communication devices, in recent years, have increased the use of these devices in commercial and financial transactions. With the increase in use has come the propensity to use them in a fraudulent manner in these types of transaction. There has also been a definite increase in theft of communication devices, with the associated use of these stolen devices for fraudulent use.

Many different methods have been proposed to limit the increase in fraud using communication devices, most of them are oriented at specific applications, such as mobile payment, order processing etc. There is also a big push to improve the security of transactions by use of embedded agents, password use, encryption and other similar methods as well as methods that tend to link a mobile device to a specific location to prevent fraudulent operations. With all these in existence there is still no good method to judge or project fraudulent use of a mobile device and initiate corrective action.

It will hence be useful to have a method and system that can provide the capability to assess the possibility of fraudulent use of a mobile device in use, with a reasonable probability of success. It will be further useful to have this ability available for checking and verification of the authenticity of user of mobile device, such that the mobile device is enabled for active commercial and financial operation.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. In the drawings.

DETAILED DESCRIPTION

Figure 1:
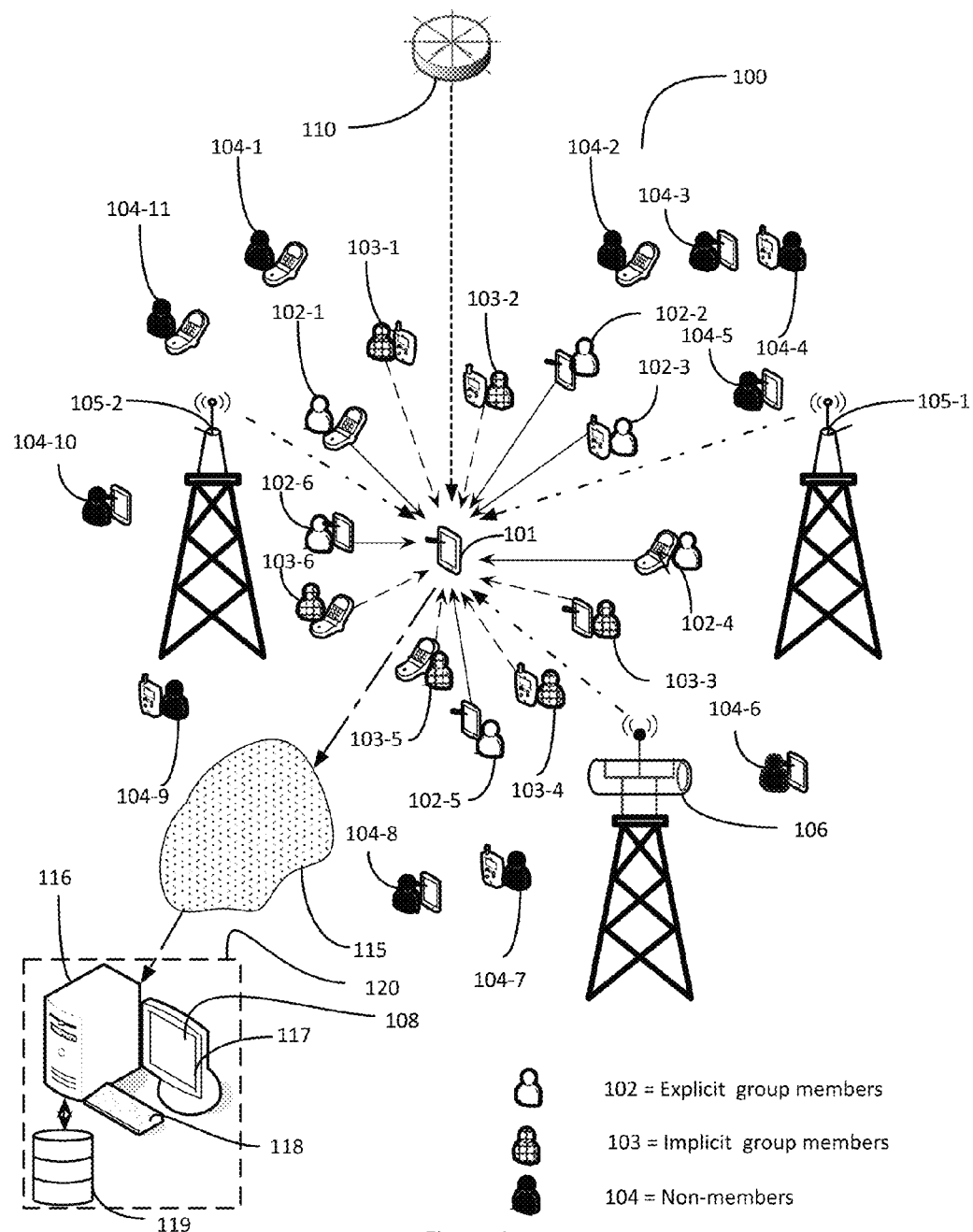
FIG. 1 is an exemplary block representation of a system according to one embodiment of the invention.

In the following description, numerous specific details are set forth. However, it is understood that embodiments of the invention may be practiced without these specific details. In other instances, well-known circuits, structures, and techniques have not been shown to avoid obscuring the understanding of this description.

In the description, certain terminology is used to describe features of the invention. For example, in certain situations, the terms "component," "unit," "module," and "logic" are representative of hardware and/or software configured to perform one or more functions. For instance, examples of "hardware" include, but are not limited or restricted to an integrated circuit such as a processor (e.g., a digital signal processor, microprocessor, application specific integrated circuit, a micro-controller, etc.). Of course, the hardware may be alternatively implemented as a finite state machine or even combinatorial logic. An example of "software" includes executable code in the form of an application, an applet, a routine or even a series of instructions. The software may be stored in any type of machine-readable medium.

In one embodiment, a method is disclosed for determining the normal behavior of a mobile device versus the other mobile devices, in its proximity, from historic location identification, interactions, and associations. When an abnormal behavior occurs, a possibility of potential or actual fraud is suspected. Checking such behavior patterns can reduce the occurrence of fraud using registered mobile devices. Moreover, clustering can take place to determine abnormal behavior of mobile devices, for example, a concentration of multiple mobile devices that would not be expected to be together. Confidence levels and thresholds may be further added. A group may be an explicit or implicit group as described further below.

In one embodiment of the invention, a system and a method enable the determination of the normal behavior of a registered mobile device versus the other mobile devices, in its proximity, from historic location identification, interactions, and associations. This behavior pattern of associations and frequented locations is compared to the current behavior of the mobile device to determine whether the current behavior is abnormal or not. When an abnormal behavior occurs, a possibility of potential or actual fraud is suspected. Checking such behavior patterns can reduce the occurrence of fraud using registered mobile devices. The clustering at multiple unusual locations (from historic data) not frequented by the specific mobile device with unknown and unregistered mobile devices in its proximity can be taken as an indication of abnormal behavior of the specific mobile device. As an example, a concentration of multiple mobile devices that would not be expected to be together at a multiplicity of un-frequented location for a specific mobile device, can be considered as indicative of abnormal behavior and indicate possible fraudulent use and indicate a need for monitoring and assessment for fraud prevention under the current invention. Confidence levels and thresholds of the possible fraudulent behavior may also be estimated based on the historic data of associations, proximity and location information.

In some embodiments, the system and/or method uses the capability established for a group of pre-registered mobile devices registered with a tracking and monitoring server system (TMSS) to be tracked and monitored for location and associations. The normal locations and typical associations at these normal locations are collected for each of the registered mobile devices and saved in a historic location-association database (HLA-DB) linking the associations and the locations. This HLA-DB is used to establish the normal and typical behavioral pattern of each of the mobile devices. Deviations from the normal behavioral pattern of a mobile device are considered abnormal behavior and an indication to the TMSS to monitor the activity of the mobile device more closely for possibility of fraud.

FIG. 1 is an exemplary block representation, 100, of the typical proximity detection and associations of a registered mobile device, 101, at a location. In FIG. 1, the mobile devices associated with explicit group members 102-1 to 102-*m* (m>1) in combination with the mobile device 101 forms an explicit (association) group 102, and the group members 103-1 to 103-*p* (p>1) may be an implicit group 103 that comprise all the registered members, registered with a server system, and are not included in the explicit groups associated with device 101 (such as group 102). A third group that is shown in FIG. 1 is the group comprising devices 104-1 to 104-*n* (n>1) that are unregistered devices that do not fall into any of the explicit or implicit groups associated with device 101. In one embodiment, the explicit group 102 may include the mobile devices 101 and mobile devices associated with explicit group members 102-1 to 102-*m* that are members of a social networking group that are being monitored and tracked by their location. For instance, the membership to these social networks include registration with one or more central servers as part of explicit groups, such as family group, friends group, extended family and friends group, sport and club groups etc. Each of these explicit groups comprises different set of members that confirm to differing group characteristics. Combinations of these explicit groups also make up an implicit group associated with device 101. Moreover, the combinations of these explicit and implicit groups, explicit group 102, implicit group 103 together also form an implicit groups of mobile devices that has common properties, such as registration with a common server, but are not linked by an explicit registration for monitoring and tracking. For instance, implicit groups can be as indicated all registered devices, all members of a club, etc that have common properties but are not explicitly linked for monitoring and tracking.

The mobile device 101, and the mobile devices associated with groups including explicit group 102 and implicit group 103 are registered devices with a tracking and monitoring server that uses the available sensors on the registered mobile devices to fix their locations and monitor their associations with proximity sensing capability, using proximity sensors included in available on the mobile devices, and monitor other activities that are allowed/approved by the devices. According to one embodiment, the mobile device 101 has a proximity sensitivity radius such that the proximity information received by the TMSS from the mobile device 101 may include an identification of the proximate mobile devices. The typical location fixing capabilities used by the mobile devices include the GPS satellite 110, the cell towers 105-1, 105-2 and any Wi-Fi hotspots 106 whose location is known and that allow connections. The location and proximity information generated by the mobile device 101 is collected by the TMSS 120 over an Internet 115 or other available connection means for tracking and monitoring to the mobile device 101. Further, this information is stored in a part of the memory 119 in the historic location and association database (HLA-DB) of the TMSS 120. The TMSS 120 typically comprise at least a server 116 with sufficient processing power to handle the processing of the collected data to track and monitor the registered group of devices 101, 102, 103 at least a memory 119 that comprise program storage memory and database memory, at least a display device 117 having a display screen 108 and at least an input output device 118.

The explicit group of devices 102-1 to 102-6, that are shown as being in the proximity of the mobile device 101, are part of an explicit group of devices with the mobile device 101. The implicit group of devices 103-1 to 103-6, that are shown as being in the proximity of the mobile device 101, are part of implicit group of registered devices due to the fact that they are part of the registered group of devices even though they are not part of any explicit group associated with mobile device 101. This group although shown as a single group can be divided into multiple sub-groups, each having its own characteristics. The group of devices 104-1 to 104-11 forms an unregistered and non-trackable group (e.g., cannot be tracked by the system) that is in the proximity of the mobile device 101 and sensed by the proximity sensor of mobile device 101. Typically, these three sets of device association groups, 102, 103, 104, form the proximity group of association-group members that are sensed by the mobile device 101 in FIG. 1.

Figure 2:
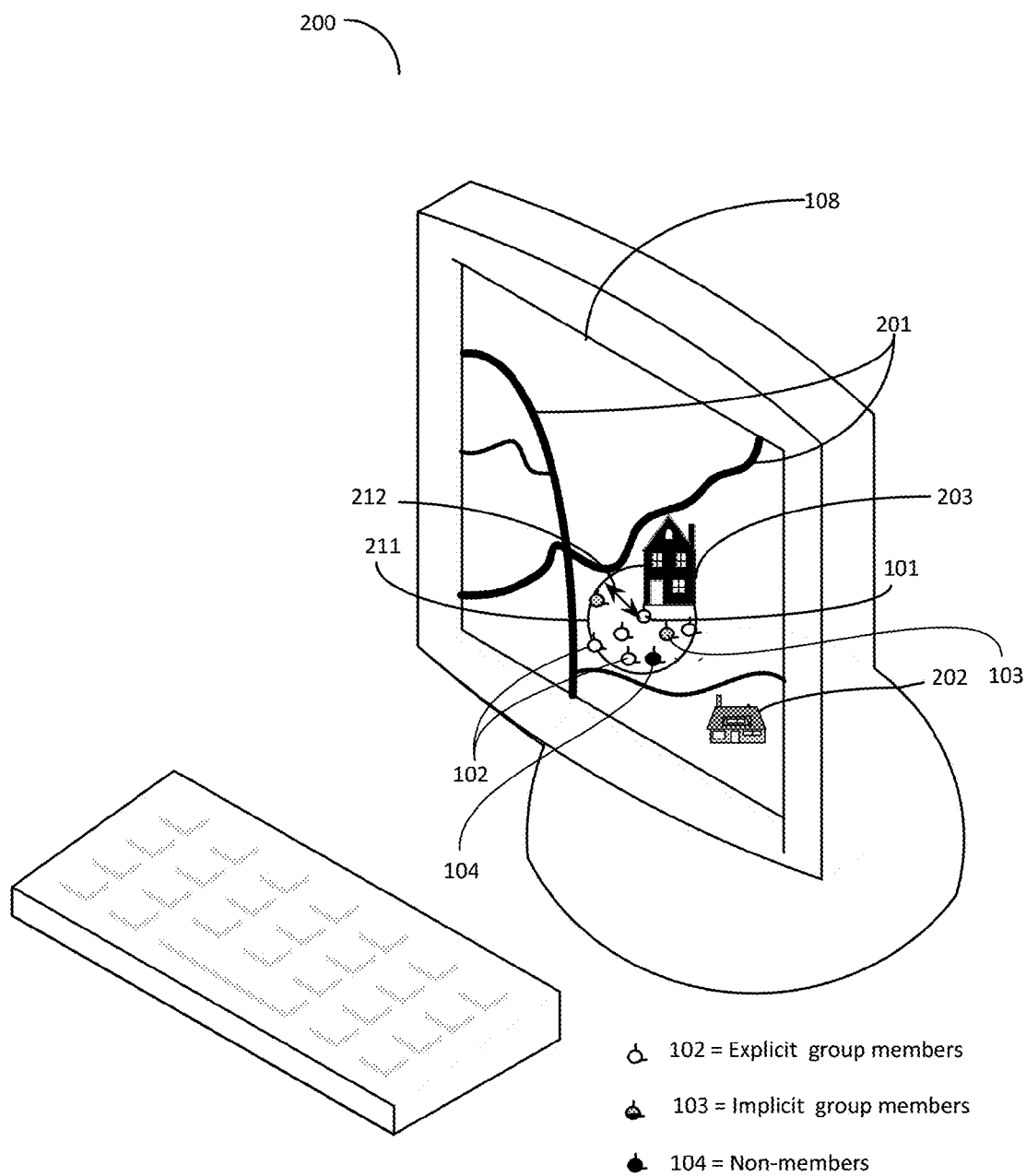
FIG. 2 is an exemplary view of the display at a tracking and monitoring server of a mobile device in accordance to an embodiment of the invention.

FIG. 2 is an exemplary view 200 of the display 108 at a tracking and monitoring server 120 of a mobile device 101 in accordance to an embodiment of the invention. Specifically, in FIG. 2, the exemplary view 200 on the display 108 of the TMSS 120 of a mobile device 101 at a typically frequented location 203 shows the explicit group members 102, implicit group members 103, and non-registered members 104, that the specific communication device 101 is associating with or is in proximity of. The view 200 shows the location of the mobile device 101 on a map that shows the location of distinguishing items such as major roads 201 and locations of structures 202, 203, etc. The mobile device's 101 proximity sensor has a sensing radius 212 enabling it to sense any devices in the proximity falling within the sense limit 212 of the proximity sensors. This capability is used to define an association-group 211 for the mobile device 101. In the view 200, the association-group 211 of mobile device 101 comprises four explicit group members 102, two implicit group members 103 and one non-registered mobile device 104. In this embodiment of the invention, the TMSS 120 is able to collect the association-group 211 member information from the registered group of mobile devices using proximity sensing, at various frequented locations, and store the data in the in the HLA-DB in the memory 119 of the TMSS 120.

Figure 3:
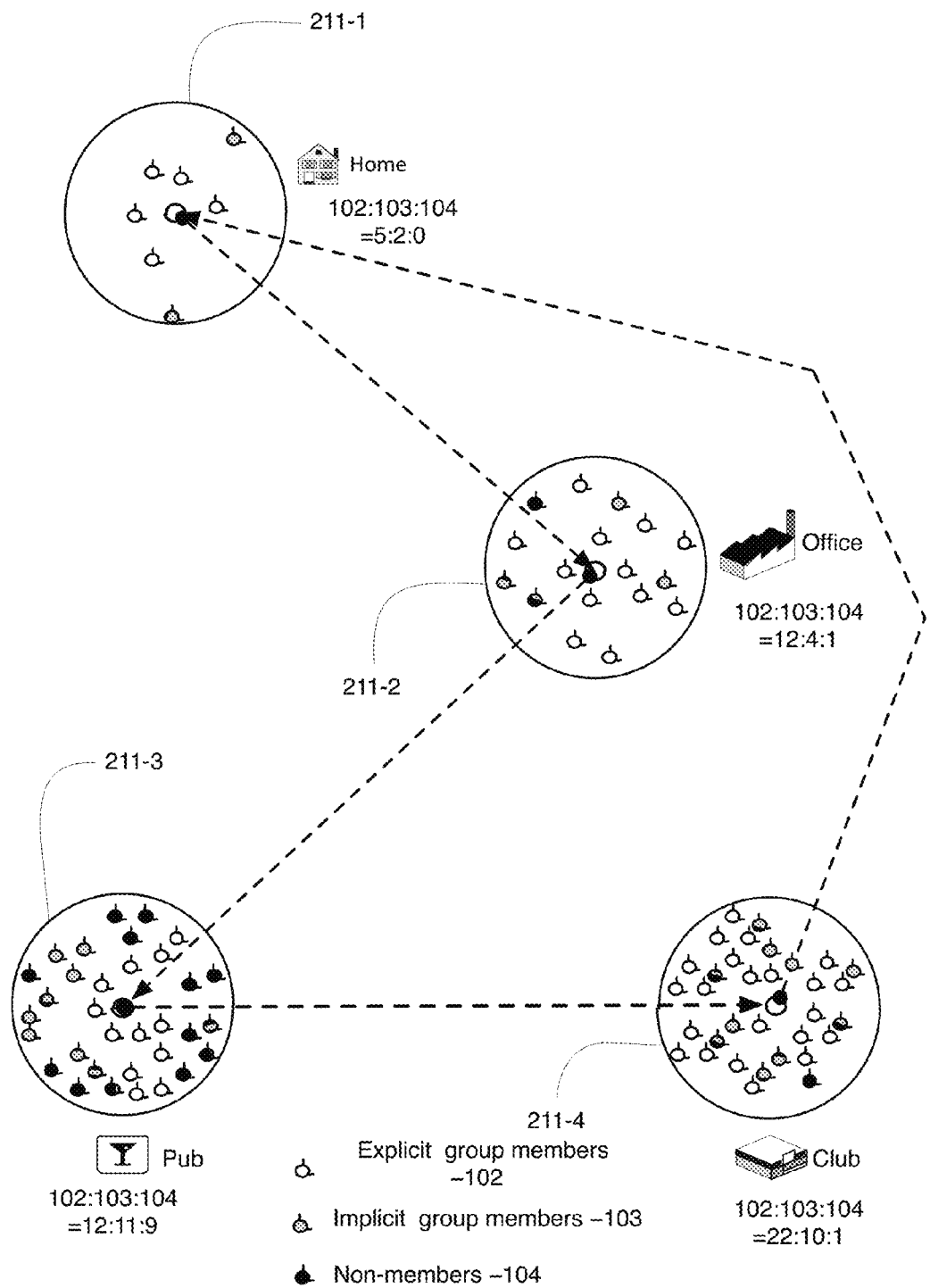
FIG. 3 is an exemplary block diagram 300 of a normal routine behavior pattern of locations and associations of a mobile device, in accordance with an embodiment of the invention.

FIG. 3 is an exemplary block diagram 300 of a normal routine behavior pattern of locations and associations of a mobile device, in accordance with an embodiment of the invention. Specifically, FIG. 3 is a block diagram representation 300 of a normal routine behavior pattern of locations and associations (e.g., association-group 211 members) of a mobile device 101, at the locations, supported by historic behavior. The data collected using the proximity sensor of the mobile device 101 of each of the groups 102, 103, 104 forming the association-group 211 members for the mobile device 101 over a period of time is used to generate the historic data, mean, median and range, for each group 102, 103, 104 that forms the association-group for the mobile device 101. This data is again saved in the HLA-DB, in the memory 119 of the TMSS 120. The typical behavioral pattern may vary with days of the week etc., but an average or regular pattern can be established from the historic data of activity of the mobile device 101 saved in the HLA-DB. This behavior pattern will include the locations 211 frequented by the mobile device 101. The exemplary list (or specified set of locations) for a day in consideration from HLA-DB is shown in FIG. 3 to include: Home 211-1, Office 211-2, Pub 211-3, and Club 211-4. If on one day, the specified the same set of locations or a selection from the same set of locations are frequented by the mobile device 101, the frequented locations are considered normal. Similarly, if each of the groups 102, 103, 104 associating with the mobile device 101 at each of the above locations 211-1, 211-2, 211-3, 211-4 remain within the set of parameters established by the historic data, the associations are considered normal.

Figure 4:
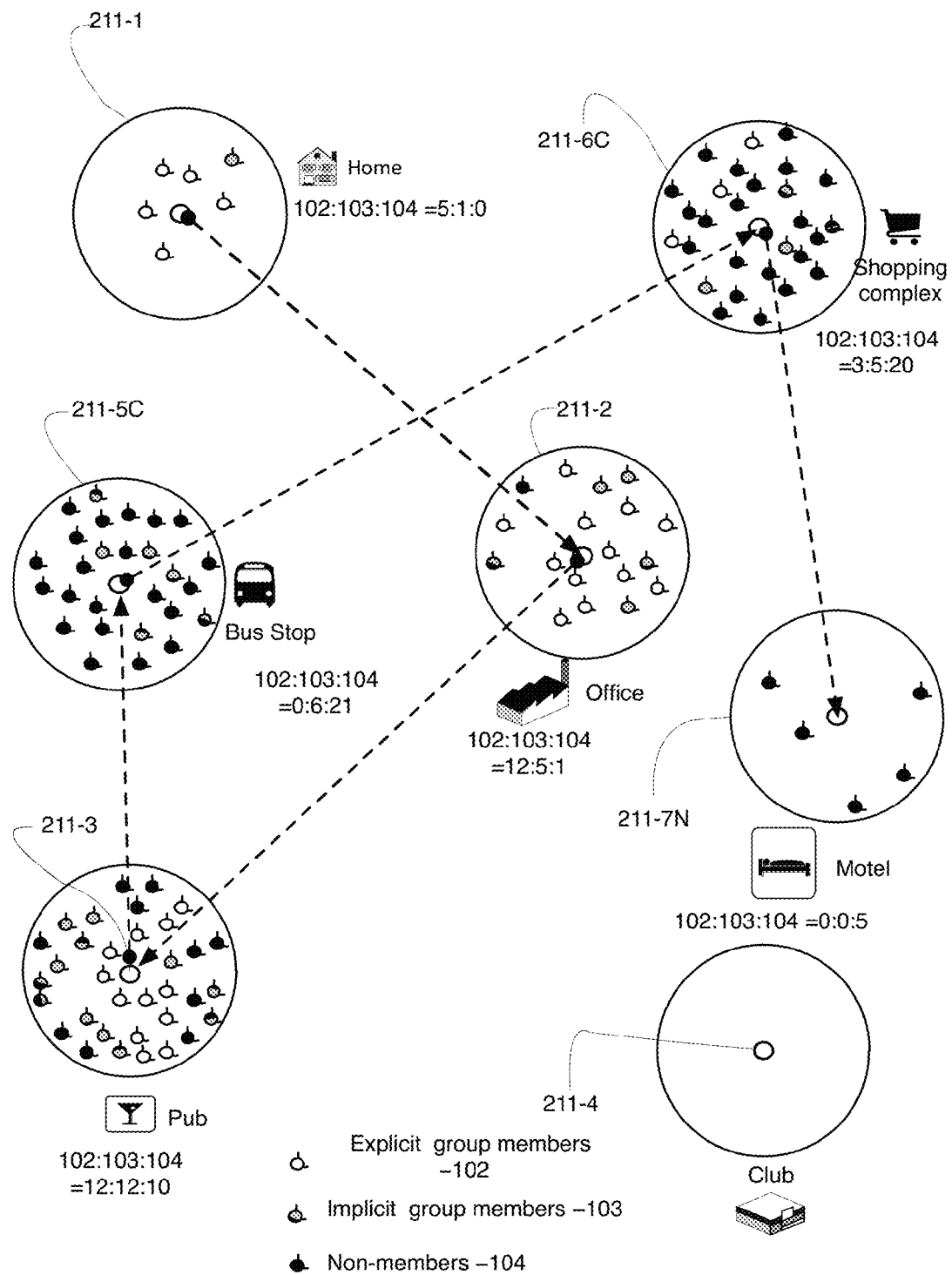
FIG. 4 is an exemplary block diagram 400 of a possible abnormal behavior according to an embodiment of the invention.

FIG. 4 is an exemplary block diagram 400 of a possible abnormal behavior according to an embodiment of the invention. Specifically, FIG. 4 is a block diagram representation 400 of an abnormal behavior pattern of locations and associations (e.g., association-group members) of the mobile device 101, at the locations, which deviates from the routine and is unsupported by historic behavior. As can be seen in FIG. 4, the locations are home 211-1, office 211-2, pub 211-3, bus-station 211-5, shopping center 211-6 and a motel 211-7. The exemplary list, for the day in consideration, from HLA-DB, shown in FIG. 3 includes: Home 211-1, Office 211-2, Pub 211-3, and Club 211-4. Of the locations frequented as shown in FIG. 4, the mobile device 101, confirms that the locations including home 211-1, office 211-2 and pub 211-3 are typical locations of that day from historic data but deviates from historic data stored in HLA-DB with regards to the club 211-4 location in that the mobile device 101 did not frequent the club 211-4 as delineated in its regular routine (FIG. 3). In addition the mobile device 101 visits the known locations (e.g., previously visited locations) of bus station 211-5, shopping center 211-6, and adds a new location, motel 211-7, not previously in the preferred location list of the mobile device 101. If during checking and comparing the association-group 211 members at each of the locations, deviations from previously established parameters are identified, this acts as additional support for possibility of fraudulent use of the mobile device 101.

Figure 5:
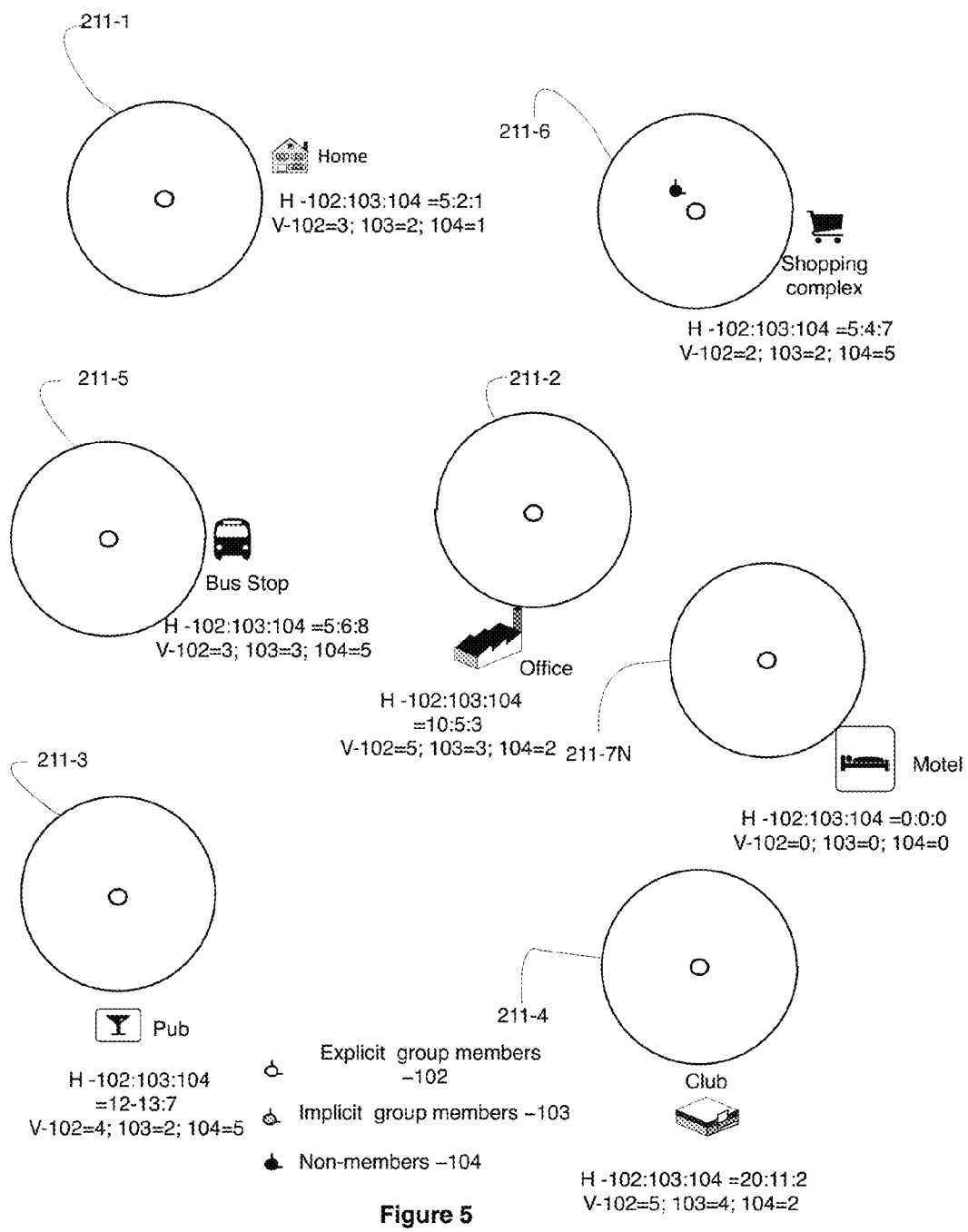
FIG. 5 is an exemplary diagram 500 showing the historic average and maximum deviation of each associated mobile groups, at each frequented location, for the mobile device, in accordance with an embodiment of the invention.

FIG. 5 shows an exemplary diagram 500 showing the historic median and maximum deviation (range) of each associated mobile groups, at each frequented location, for the mobile device 101, in accordance with an embodiment of the invention. Any time a normal behavior of a device is confirmed, that data is used to update the HLA-DB in the memory 119 of the TMSS 120. FIG. 5 shows all the preferred locations currently identified 211-1 to 211-7 and show the median and range of association-group 211 members, using an exemplary algorithm, in the locations from historic data stored in the HLA-DB. This data is compared with the current data to assess the behavioral status, normal or abnormal, in terms of associations of the mobile device, 101. The Tables 1 and 2 show the use of this data in practice. It should be noted that different and more complex algorithms may be available and may be used, by practitioners of the art, to determine group dynamics for assessing normal and abnormal behavior.

Herein, Table 1 and Table 2 provide a very simplistic example of the use of the historic data to distinguish normal behavior. The example generates the median and range of association group-members 102, 103, 104 data from historic data of normal behavior stored in the HLA-DB, for the typical locations frequented by the mobile device 101. This historic data is compared with the current locations and association group-member data at the locations to establish the difference between normal and abnormal behavior of a mobile device 101. In other embodiments, more complex algorithms are used to provide projections of possibility of fraud using the mobile device 101 that shows abnormal behavior.

Table 1 shows the normal behavior of the mobile device 101. The first column provides the list of locations, which are typical for the day, for the mobile device, 101. The current association group-members data for 102, 103, 104, at each of the locations shown in column 1 of the Table 1, is shown in columns 8 to 10. The acceptable absolute range values for association group-members of each group 102, 103, 104 derived from the historic data in columns 2 to 7 are shown in columns 11 to 13. It is seen that the current values in column 8 to 10 fall within the absolute acceptable range values for association groups. Since locations are typical accepted locations for the mobile device 101 and the association group numbers are within the expected ranges, normal activity of the mobile device is confirmed with a high degree of confidence and the collected data is used to update the association group-member data in the HLA-DB.

Location Based Historic Association Group-Member Data

Vs Current Association Group-Member Data

TABLE 1

(Normal Behavior)
Table 1: The locations covered are typical for the day and the memberships in the association group at each location fall within the allowable range. This hence is a normal activity for the mobile device.

| 1. Location | 2. Historic Association Member Data -Mean & Range | | | | | | 3. Current Data | | | 4. Hi/low | | | 5. Normal(N)/ Ab-Normal(AN) | |
|---|---|---|---|---|---|---|---|---|---|---|---|---|---|---|
| Identity | 102 | +/− | 103 | +/− | 104 | +/− | 102 | 103 | 104 | 102 | 103 | 104 | Loc. | Assn. |
| Home (211-1) | 5 | 3 | 2 | 2 | 1 | 1 | 5 | 2 | 0 | 8/2 | 4/0 | 2/0 | N | N |
| Office (211-2) | 10 | 5 | 5 | 3 | 3 | 2 | 12 | 4 | 1 | 15/5 | 8/2 | 5/1 | N | N |
| Pub (211-3) | 12 | 4 | 13 | 2 | 7 | 5 | 12 | 11 | 9 | 16/8 | 15/11 | 12/2 | N | N |
| Club (211-4) | 20 | 5 | 11 | 4 | 2 | 2 | 22 | 10 | 1 | 25/15 | 15/7 | 4/0 | N | N |

Table 2 shows an instance of abnormal behavior of the mobile device, 101. The first column provides the list of locations, which are typical for the day, for the mobile device 101. Any deviation from this list is a first indication of abnormal behavior. In this instance, the mobile device 101 excludes a typical location being the club 211-4, but adds three locations being the bus station 211-5, shopping center 211-6 and a previously unvisited location being the motel, 211-7. This change in locations is a deviation from normal behavior and hence, triggers the requirement to monitor the activities of the mobile device 101 for return to normal behavior. Further, the current association group-members data for 102, 103, 104, at each of the locations shown in column 1 of the Table 2, is shown in columns 8 to 10. The acceptable absolute range values for association group-members, of each group 102,103, 104, derived from the historic data in columns 2 to 7 is shown in columns 11 to 13. It is seen that all three current values of association group members 102, 103 and 104 in column 8 to 10 fall within the absolute acceptable range values for association groups at the locations 211-1, 211-2, 211-3, but the value for at least one of the association group-members fall outside the absolute acceptable range in the three locations 211-5, 211-6, and 211-7. Since these locations are non-typical locations for the mobile device 101 and the association group numbers are outside the expected ranges, abnormal activity of the mobile device is suspected with a high degree of confidence and monitoring and notification conditions are initiated for the mobile device 101, as discussed previously.

types and more complex algorithms, more accurate association related analysis for fraudulent behavior of mobile device 101 can be assessed. Similarly, by using characteristics of locations, visited during possible abnormal behavior, in the algorithms used the assessment of probability of fraudulent use of the mobile device 101 can be improved.

The embodiments of the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Figure 6:
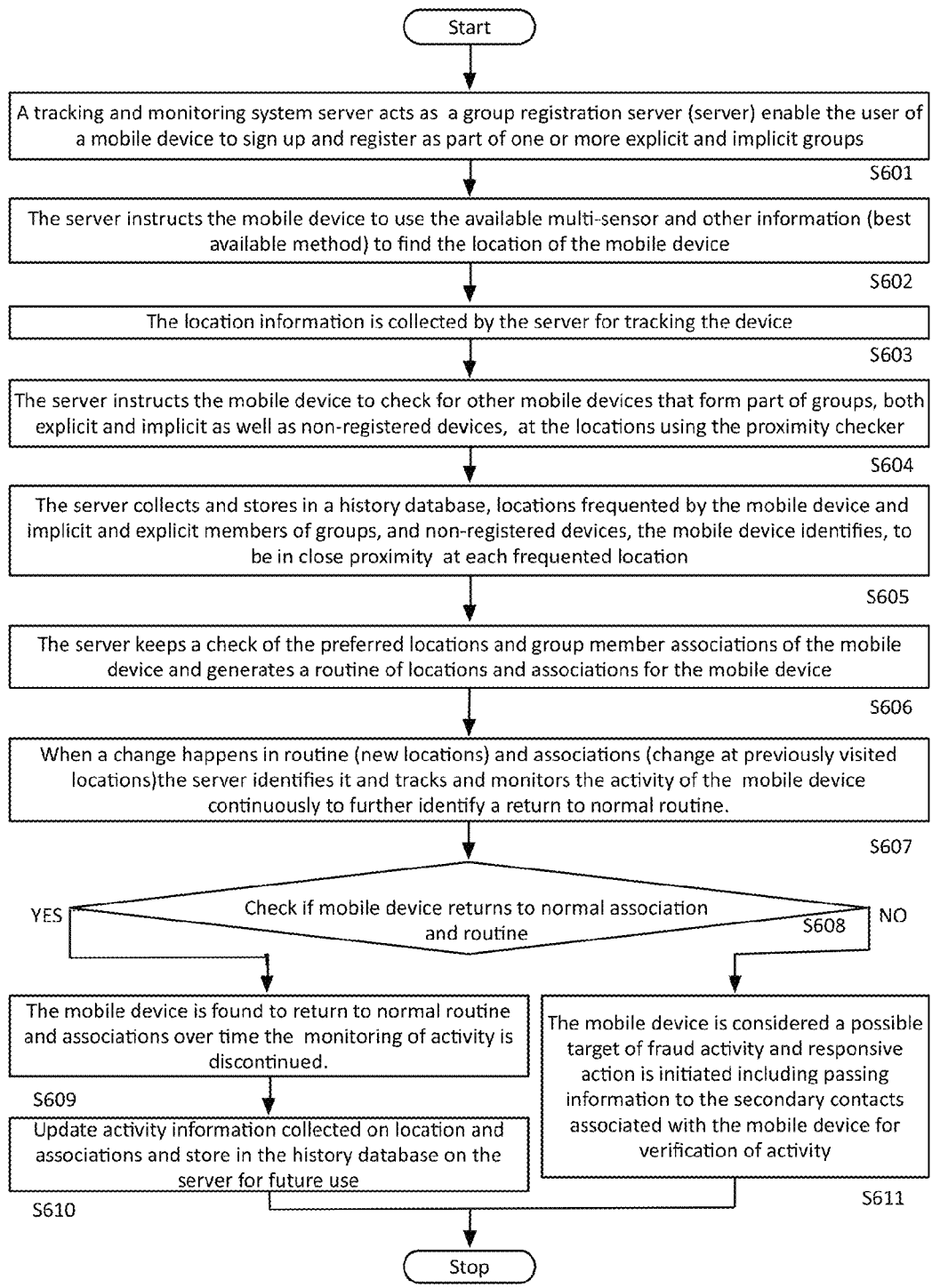
FIG. 6 is an exemplary flow chart illustrating a method of determining fraudulent use of a mobile device according to an embodiment of the invention.

FIG. 6 is an exemplary flow chart illustrating a method of determining fraudulent use of a mobile device according to an embodiment of the invention.

A TMSS server acts as a group registration server system (server) to register the mobile devices as part of a multiplicity of explicit and implicit groups of mobile devices. This server system may comprise one or more local servers, servers implemented as distributed servers or servers in the cloud. (Block S601).

The server instructs the mobile device to use the available multi-sensor and other information to find the location of the mobile device. The sensors can be any or all of GPS, triangulation using cell towers, known Wi-Fi connections etc. (Block S602).

The location information is collected by the server for tracking the device and monitoring its activities. (Block S603).

The server instructs the mobile device to check for other mobile devices that form part of groups, both explicit and Location Based Historic Association
Group-Member Data Vs Current Association
Group-Member Data

TABLE 2

(Ab-Normal Behavior)
Table 2: The typical locations frequented on the day have changed with elimination of Club 211-4, and addition of Bus Stop 211-5, Shopping Complex 211-6 and a new location Motel 211-7. Further, in the added and new locations, the memberships in the association groups fall outside the range of historic data for the groups. This indicates to abnormal activity requiring continued monitoring and notification.

| Location | Historic Association Member Data -Mean & Range | | | | | | Current Data | | | Hi/low | | | Normal(N)/ Ab-Normal (AN) | |
|---|---|---|---|---|---|---|---|---|---|---|---|---|---|---|
| Identified | 102 | +/− | 103 | +/− | 104 | +/− | 102 | 103 | 104 | 102 | 103 | 104 | Loc. | Assn. |
| Home (211-1) | 5 | 3 | 2 | 2 | 1 | 1 | 5 | 1 | 0 | 8/2 | 4/0 | 2/0 | N | N |
| Office (211-2) | 10 | 5 | 5 | 3 | 3 | 2 | 12 | 5 | 1 | 15/5 | 8/2 | 5/1 | N | N |
| Pub (211-3) | 12 | 4 | 13 | 2 | 7 | 5 | 12 | 12 | 10 | 16/8 | 15/11 | 12/2 | N | N |
| Club (211-4) xx | 20 | 5 | 11 | 4 | 2 | 2 | 0 | 0 | 0 | 25/15 | 15/7 | 4/0 | AN | AN |
| Bus Stop (211-5) | 5 | 3 | 6 | 2 | 8 | 5 | 0 | 6 | 21 | 8/2 | 8/4 | 13/3 | AN | AN |
| Shopping complex (211-6) | 5 | 2 | 4 | 2 | 7 | 5 | 3 | 5 | 20 | 7/3 | 6/2 | 12/2 | AN | AN |
| Motel - c (New) (211-7) | 0 | 0 | 0 | 0 | 0 | 0 | 0 | 0 | 5 | 0 | 0 | 0 | AN | AN |

Even though the current algorithm shown for determining probable fraudulent use of the mobile device 101 uses the three major groups, including the explicit 102, implicit 103 and non-registered 104, by using other available characteristics of the groups to expand the association group-member implicit, as well as non-registered devices, at the locations using the proximity checker. (Block S604).

The server collects and stores in a history database, locations frequented by the mobile device and implicit and explicit members of groups, and the non-registered devices, the mobile device identifies, to be in close proximity at each frequented locations. (Block S605).

The server keeps a check of the preferred locations and group member associations of the mobile device, as identified by the proximity sensors of the mobile device. This information is used to generate an association-group of devices whose composition is recorded in the history database. The stored information is used to generate a routine of locations and associations for the mobile device with times, locations and association-group data. (Block S606).

When a change in the routine of the mobile device is recognized by the server, in terms of locations (e.g., new locations) and associations (e.g., change of association details at previously visited locations), the server initiates increased tracking and monitoring of the activity of the mobile device, in a continuous fashion to identify any possible fraudulent activity and identify a return to normal routine of the mobile device. (Block S607).

The server continually checks for a predetermined period of time if the mobile device has returned to normal association and routine. (Block S608).

If the normal routine is recognized, the server discontinues the extended monitoring activity with respect to the mobile device and returns to the standard monitoring process. (Block S609).

Since the activity of the mobile device is recognized as normal (e.g., even with the changes), the collected information on location and association-groups are used to update the history database on the server for future use. (Block S610).

If the activity does not return to normal within reasonable time period (e.g., a predetermined period of time), the mobile device is considered a high probability target of fraud activity and responsive action is initiated. This includes among other actions, increased monitoring, reducing the capabilities available to the device for fraud, passing information that the device has been compromised and possibly lost, to the secondary contacts associated with the mobile device for verification of activity etc. (The secondary contacts may be the phone company for tracking, and other security related entities including police, to verify and restrict fraudulent activities that may include any purchase activity using the device and information on the device, long distance calls and communication to other devices, use to access sites that are restricted or limited, access and publication of pictures and information stored on the device etc.) Any additional activity (eg. filing of criminal cases) will depend on the responses received from the contacts and actions described. (Block S611).

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

An embodiment of the invention may be a machine-readable medium having stored thereon instructions which program a processor to perform some or all of the operations described above. A machine-readable medium may include any mechanism for storing or transmitting information in a form readable by a machine (e.g., a computer), such as Compact Disc Read-Only Memory (CD-ROMs), Read-Only Memory (ROMs), Random Access Memory (RAM), and Erasable Programmable Read-Only Memory (EPROM). In other embodiments, some of these operations might be performed by specific hardware components that contain hardwired logic. Those operations might alternatively be performed by any combination of programmable computer components and fixed hardware circuit components.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

What is claimed is:

1. A method of determining fraudulent use of a first mobile device based on behavioral abnormality, the method comprising:

receiving, by a processor, a first location data and a first proximity information from the first mobile device, wherein the first proximity information includes an identification of mobile devices that are within a proximity sensitivity radius of the first mobile device;

displaying, by a display device, the first mobile device's location based on the first location data;

determining, by the processor, whether the first location data and the first proximity information are included in a historical location data and a historical proximity information, respectively, associated with the first mobile device, wherein the historical location data and the historical proximity information associated with the first mobile device is included in a historical database; and when the first location data and the first proximity information are not included in the historical location data and historical proximity information, respectively, associated with the first mobile device, monitoring, by the processor, a fraudulent use of the first mobile device including: determining, by the processor, whether subsequent location data and subsequent proximity information received from the first mobile device over a predetermined period of time are included in the historical location data and historical proximity information, respectively, associated with the first mobile device;

updating, by the processor, the historical database by storing the first location data and the first proximity information in the historical location data and historical proximity information, respectively, associated with the first mobile device, when the subsequent location data and the subsequent proximity information received from the first mobile device over the predetermined period of time is included in the historical location data and historical proximity information, respectively, associated with the first mobile device; and;

signaling, by the processor, a fraudulent use of the first mobile device when the subsequent location data and the subsequent proximity information received from the first mobile device over the predetermined period of time are not included in the historical location data and historical proximity information, respectively, associated with the first mobile device.

2. The method of claim 1, further comprising:
signaling, by the processor, to discontinue monitoring the fraudulent use of the first mobile device when subsequent location data and the subsequent proximity information received from the first mobile device over the predetermined period of time is included in the historical location data and the historical proximity information, respectively, associated with the first mobile device.

3. The method of claim 1, wherein signaling by the processor to monitor the fraudulent use of the first mobile device comprises:
passing information to secondary contacts associated with the first mobile device for verification of fraudulent activity.

4. The method of claim 1, wherein the first location information includes a location of the first mobile device obtained using at least one of: GPS, and triangulation using cell towers and WiFi connections.

5. The method of claim 1, further comprising:
receiving, by a processor, location data and proximity information from each of a plurality of mobile devices, respectively, wherein the plurality of mobile devices includes the first mobile device.

6. The method of claim 5, further comprising:
storing, by the processor, the location data and proximity information from each of the plurality of mobile devices in the historical database in association with each of the plurality of mobile devices, respectively.

7. The method of claim 6, wherein, when subsequent proximity information received from the first mobile device over the predetermined period of time is not included in the historical location data and the historical proximity information, respectively, associated with the first mobile device, the method further comprising:
determining, by the processor, whether the location data and proximity information from each of the plurality of mobile devices are included in the historical location data and the historical proximity information associated with each of the plurality of mobile devices, respectively.

8. The method of claim 1, wherein the first proximity information includes the identification of mobile devices including at least one of (i) a mobile device included in an explicit group that includes the first mobile device, (ii) a mobile device included an implicit group that includes the first mobile device, and (iii) a mobile device that is not a member of the explicit group or the implicit group.

9. An apparatus for determining fraudulent use of a first mobile device based on behavioral abnormality, the apparatus comprising:
a historical database to store historical location data and historical proximity information associated with the first mobile device;
a processor coupled to the historical database, the processor
to receive a first location data and a first proximity information from the first mobile device, wherein the first proximity information includes an identification of mobile devices that are within a proximity sensitivity radius of the first mobile device,
to determine whether the first location data and the first proximity information are included in the historical location data and the historical proximity information, respectively, associated with the first mobile device,
when the first location data and the first proximity information are not included in the historical location data and historical proximity information, respectively, associated with the first mobile device, to monitor a fraudulent use of the first mobile device including: to determine whether subsequent location data and subsequent proximity information received from the first mobile device over a predetermined period of time is included in the historical location data and historical proximity information, respectively, associated with the first mobile device
to update the historical database by storing the first location data and the first proximity information in the historical location data and historical proximity information, respectively, associated with the first mobile device when the subsequent location data and the subsequent proximity information received from the first mobile device over the predetermined period of time is included in the historical location data and historical proximity information, respectively, associated with the first mobile device; and
to signal the fraudulent use of the first mobile device when the subsequent location data and the subsequent proximity information received from the first mobile device over the predetermined period of time is not included in the historical location data and historical proximity information, respectively, associated with the first mobile device; and
a display device coupled to the processor to display the first mobile device's location based on the first location data.

10. The apparatus of claim 9, wherein the processor further
to signal to discontinue monitoring the fraudulent use of the first mobile device when the subsequent location data and the subsequent proximity information received from the first mobile device over the predetermined period of time is included in the historical location data and historical proximity information, respectively, associated with the first mobile device.

11. The apparatus of claim 9, wherein the processor signaling to monitor the fraudulent use of the first mobile device comprises:
passing information to secondary contacts associated with the first mobile device for verification of fraudulent activity.

12. The apparatus of claim 9, wherein the first location information includes a location of the first mobile device obtained using at least one of: GPS, and triangulation using cell towers and WiFi connections.

13. The apparatus of claim 9, wherein the processor further
to receive location data and proximity information from each of a plurality of mobile devices, respectively, wherein the plurality of mobile devices includes the first mobile device.

14. The apparatus of claim 13, wherein the processor further
to store the location data and proximity information from each of the plurality of mobile devices in the historical database in association with each of the plurality of mobile devices, respectively.

15. The apparatus of claim 14, wherein, when subsequent proximity information received from the first mobile device over the predetermined period of time is not included in the historical location data and the historical proximity information, respectively, associated with the first mobile device, the processor further
  to determine whether the location data and proximity information from each of the plurality of mobile devices are included in the historical location data and the historical proximity information associated with each of the plurality of mobile devices, respectively.

16. The apparatus of claim 9, wherein the first proximity information includes the identification of mobile devices including at least one of (i) a mobile device included in an explicit group that includes the first mobile device, (ii) a mobile device included an implicit group that includes the first mobile device, and (iii) a mobile device that is not a member of the explicit group or the implicit group.

17. A non-transitory computer-readable medium having stored thereon instructions that, when executed by a processor, causes the processor to perform a method of determining fraudulent use of a first mobile device based on behavioral abnormality, the method comprising:
  receiving a first location data and a first proximity information from the first mobile device, wherein the first proximity information includes an identification of mobile devices that are within a proximity sensitivity radius of the first mobile device;
  displaying, by a display device, the first mobile device's location based on the first location data;
  determining whether the first location data and the first proximity information are included in a historical location data and a historical proximity information, respectively, associated with the first mobile device, wherein the historical location data and the historical proximity information associated with the first mobile device are included in a historical database;
  when the first location data and the first proximity information are not included in the historical location data and historical proximity information, respectively, associated with the first mobile device, monitoring a fraudulent use of the first mobile device including:
  determining whether subsequent location data and subsequent proximity information received from the first mobile device over a predetermined period of time is included in the historical location data and historical proximity information, respectively, associated with the first mobile device;
  updating the historical database by storing the first location data and the first proximity information in the historical location data and historical proximity information, respectively, associated with the first mobile device, when the subsequent location data and the subsequent proximity information received from the first mobile device over the predetermined period of time is included in the historical location data and historical proximity information, respectively, associated with the first mobile device; and
  signaling a fraudulent use of the first mobile device when the subsequent location data and the subsequent proximity information received from the first mobile device over the predetermined period of time is not included in the historical location data and historical proximity information, respectively, associated with the first mobile device.

18. The non-transitory computer-readable medium of claim 17, having stored thereon instructions that, when executed by a processor, causes the processor to perform the method further comprising:
  signaling to discontinue monitoring the fraudulent use of the first mobile device when the subsequent location data and subsequent proximity information received from the first mobile device over the predetermined period of time are included in the historical location data and historical proximity information, respectively, associated with the first mobile device.

19. The non-transitory computer-readable medium of claim 17, wherein signaling by the processor to monitor the fraudulent use of the first mobile device comprises:
  passing information to secondary contacts associated with the first mobile device for verification of fraudulent activity.

20. The non-transitory computer-readable medium of claim 17, having stored thereon instructions that, when executed by a processor, causes the processor to perform the method further comprising:
  storing location data and proximity information received from each of the plurality of mobile devices in the historical database in association with each of the plurality of mobile devices, respectively.

* * * * *